United States Patent
Fukushima et al.

(10) Patent No.: US 8,901,266 B2
(45) Date of Patent: Dec. 2, 2014

(54) METHOD FOR PRODUCING DIALLYLDIALKYLAMMONIUM SALT/MALEIC ACID COPOLYMER

(75) Inventors: Yusuke Fukushima, Koriyama (JP); Yasuhito Nakata, Koriyama (JP); Minoru Takeuchi, Tokyo (JP)

(73) Assignee: Nitto Boseki Co., Ltd., Fukushima-shi, Fukushima (JP)

( * ) Notice: Subject to any disclaimer, the term of this patent is extended or adjusted under 35 U.S.C. 154(b) by 570 days.

(21) Appl. No.: 13/254,423

(22) PCT Filed: Feb. 23, 2010

(86) PCT No.: PCT/JP2010/001182
§ 371 (c)(1),
(2), (4) Date: Oct. 25, 2011

(87) PCT Pub. No.: WO2010/109766
PCT Pub. Date: Sep. 30, 2010

(65) Prior Publication Data
US 2012/0116011 A1    May 10, 2012

(30) Foreign Application Priority Data
Mar. 26, 2009 (JP) .................... 2009-75391
Jul. 10, 2009 (JP) .................... 2009-163820

(51) Int. Cl.
*C08F 226/04* (2006.01)
*C08F 2/04* (2006.01)
*C08F 6/08* (2006.01)
*C08F 8/36* (2006.01)
*C08F 222/02* (2006.01)
*C08F 2/10* (2006.01)
*C08F 4/00* (2006.01)
*C08F 6/00* (2006.01)
*C08F 6/02* (2006.01)
*C09D 11/00* (2014.01)

(52) U.S. Cl.
CPC ... *C08F 2/10* (2013.01); *C08F 4/00* (2013.01); *C08F 6/006* (2013.01); *C08F 6/02* (2013.01); *C08F 226/04* (2013.01); *C09D 11/00* (2013.01)

USPC ........... 526/310; 524/555; 526/229; 528/336

(58) Field of Classification Search
USPC .................... 526/310, 229; 524/555; 528/336
See application file for complete search history.

(56) References Cited

U.S. PATENT DOCUMENTS 6,395,849 B1    5/2002  Kato et al.

FOREIGN PATENT DOCUMENTS

| DE | 274 432 | 12/1989 | | |
|---|---|---|---|---|
| EP | 1 268 214 | 6/2006 | | |
| JP | 4-193308 | 7/1992 | | |
| JP | 7-68298 | 7/1995 | | |
| JP | 10-166718 | 6/1998 | | |
| JP | 10166718 | * | 6/1998 | ............... B41M 5/00 |
| JP | 2003-529640 | 10/2003 | | |
| JP | 2004-25773 | 1/2004 | | |
| JP | 2004025773 A | * | 1/2004 | ............... B41M 5/00 |

OTHER PUBLICATIONS

International Search Report for PCT/JP2010/001182, mailed May 25, 2010.
Written Opinion of the International Searching Authority for PCT/JP2010/001182, mailed May 25, 2010.

* cited by examiner

*Primary Examiner* — Ling Choi
*Assistant Examiner* — Chung-Cheng Wang
(74) *Attorney, Agent, or Firm* — Nixon & Vanderhye P.C.

(57) ABSTRACT

Provided is a process for producing a copolymer of diallyldialkylammonium salt and a maleic acid which copolymer is free of residual monomers and polymerization initiator and hence stably exhibits excellent performances in various uses, and the process comprises polymerizing a monomer mixture comprising diallyldialkylammonium salt and maleic acid in the presence of persulfate as a radical polymerization initiator in water or a polar solvent, and completion of the polymerization-reaction, decomposing the radical polymerization initiator to produce a copolymer comprising diallyldialkylammonium salt constituent unit and a maleic acid constituent unit.

10 Claims, No Drawings

METHOD FOR PRODUCING DIALLYLDIALKYLAMMONIUM SALT/MALEIC ACID COPOLYMER

This application is the U.S. national phase of International Application No. PCT/JP2010/001182, filed 23 Feb. 2010, which designated the U.S. and claims priority to JP Application No. 2009-075391 filed 26 Mar. 2009, and JP Application No. 2009-163820, filed 10 Jul. 2009, the entire contents of each of which are hereby incorporated by reference.

TECHNICAL FIELD

This invention relates to a method for producing a copolymer of diallyldialkyl ammonium salt and maleic acid, and more specifically, to a process for producing a copolymer of diallyldialkyl ammonium salt and maleic acid, which copolymer is almost free of a residual monomer and a residual peroxide ion.

Further, this invention relates to a process for producing an inkjet recording medium using a copolymer of diallyldialkyl ammonium salt and maleic acid obtained by the above process.

TECHNICAL BACKGROUND

A copolymer of diallyldialkyl ammonium salt and maleic acid is obtained by employing diallyldialkyl ammonium salt and maleic acid as monomers and copolymerizing them in an aqueous solution (see Patent Document 1), and it attracts attention regarding its various uses such as a flocculating agent, a deodorant, a paper making auxiliary, etc. (see Patent Document 2).

According to studies made by the present inventors, when monomers for the above copolymer are polymerized under conditions for producing a low molecular weight product of the polymer, there are some cases where the polymerization yield is low and residual monomers exist. Further, when an attempt is made to produce a terpolymer of diallyldialkyl ammonium salt, maleic acid and sulfur dioxide, it is required to carry out polymerization at a relatively low temperature, so that there are also some cases where the polymerization yield is low and residual monomers exist. As a result, when these are used in various uses, the residual monomers sometimes affect the performance thereof.

Meanwhile, it is known to use a distillation method or an ion-exchange membrane electrodialysis method for the removal of cationic monomer, etc., that are impurities after the polymerization. According to studies made by the present inventors, when the cationic monomer is a diallyldialkyl ammonium salt, there has been a problem that it is difficult to remove the cationic monomer as compared with normal monomers since it is a non-volatile quaternary salt. It has been hence studied to decrease the residual monomer by using a large amount of a polymerization initiator. However, it has been found that a very small amount of a remaining polymerization initiator sometimes affects the performance in various uses to cause a problem anew.

PRIOR ART DOCUMENTS

Patent Documents

[Patent Document 1] East German Patent Laid-Open No. 274432 (1989)
[Patent Document 2] JP 4-193308 A

SUMMARY OF THE INVENTION

Problems to be Solved by the Invention

In the light of the above problems, it is an object of this invention to provide a process for producing a copolymer of diallyldialkyl ammonium salt and maleic acid, in which residual monomers and polymerization initiator hardly remain, so that the copolymer consequently stably exhibits excellent performances in various uses.

Further, it is another object of this invention to provide a process for producing an inkjet recording medium excellent in light resistance under conditions of very high light intensity, using a copolymer of diallyldialkyl ammonium salt and maleic acid obtained by the above process.

Means to Solve the Problems

As a result of studies made by the present inventors for achieving the above objects, it has been found that a copolymer of diallyldialkyl ammonium salt and maleic acid which copolymer is almost free of residual monomers and residual polymerization initiator can be obtained by polymerizing a mixture comprising diallyldialkyl ammonium salt and maleic acid in water or a polar solvent in the presence of persulfate as a radical polymerization initiator and then decomposing the radical polymerization initiator after completion of the polymerization-reaction, and that an inkjet recording medium remarkably excellent in light resistance of printing can be obtained by using the thus-obtained copolymer of diallyldialkyl ammonium salt and maleic acid, and this invention has been accordingly completed.

This invention provides
(1) a process for producing a copolymer of diallyldialkyl ammonium salt and maleic acid, which comprises polymerizing a monomer mixture comprising diallyldialkyl ammonium salt of the following general formula (I),

[CF1]

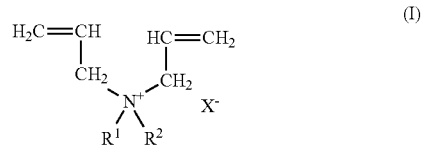

(I)

wherein each of $R^1$ and $R^2$ is independently an alkyl group having 1 to 3 carbon atoms and $X^-$ is a counter ion, and maleic acid of the following formula (II),

[CF2]

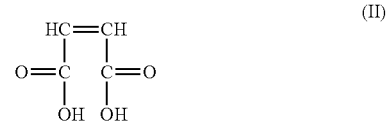

(II)

in the presence of persulfate as a radical polymerization initiator in water or a polar solvent, and, after completion of the polymerization reaction, decomposing the radical polymerization initiator to produce a copolymer comprising a diallyldialkylammonium salt constituent unit of the general formula (III) or (IV),

[CF3]

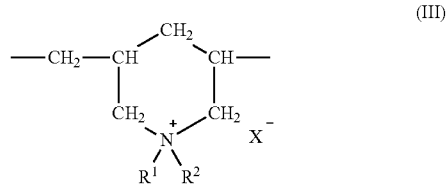

(III)

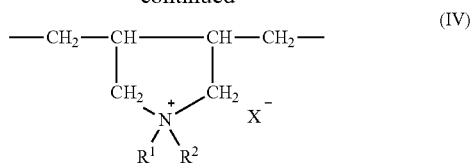

wherein each of $R^1$ and $R^2$ is independently an alkyl group having 1 to 3 carbon atoms and $X^-$ is a counter ion, and a maleic acid constituent unit of the following formula (V),

[CF4]

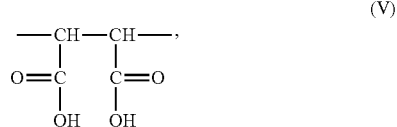

(2) a process as recited in the above (1), wherein the monomer mixture as a raw material comprises the diallyldialkylammonium salt (I) and the maleic acid (II), and the copolymer as an end product is a bipolymer of the diallyldialkylammonium salt constituent unit (III) or (IV) and the maleic acid constituent unit (V), (3) a process as recited in the above (1), wherein the monomer mixture as a raw material comprises the diallyldialkylammonium salt (I), the maleic acid (II) and sulfur dioxide, and the copolymer as an end product is a terpolymer of the diallyldialkylammonium salt constituent unit (III) or (IV), the maleic acid constituent unit (V) and a sulfur dioxide constituent unit of the following formula (VI),

[CF5]

(4) a process as recited in any one of the above (1) to (3), wherein the completion of the polymerization is followed by heat treatment at 65 to 80° C., to decompose the radical polymerization initiator, (5) a process as recited in any one of the above (1) to (4), wherein the radical polymerization initiator is decomposed after a reaction mixture obtained after the completion of the polymerization is diluted with water or a polar solvent, (6) a process as recited in the above (2), wherein the molar ratio of the diallyldialkylammonium salt (I) and the maleic acid (II) as raw material monomers is adjusted to 1:(0.1-1), the amount of the persulfate to be used based on the total molar amount of all of the monomers is adjusted to 3 mol % or more, the concentration of all of the monomers as raw materials in the reaction mixture is adjusted to 20 to 70 mass % and the polymerization reaction temperature is adjusted to 30 to 62° C. to carry out the polymerization reaction, and after the polymerization reaction, the reaction mixture is diluted with water or a polar solvent such that the reaction mixture has a polymer concentration of 5 mass % or more but less than 20 mass %, followed by the decomposition of the radical polymerization initiator, (7) a process as recited in the above (3), wherein the molar ratio of the diallyldialkylammonium salt (1) and the maleic acid (II) as raw material monomers is adjusted to 1:(0.1-1), the amount of the sulfur dioxide as a raw material based on the total molar amount of all of the monomers is adjusted to 0.1 to 30 mol %, the amount of the persulfate based on the total molar amount of all of the monomers is adjusted to 3 mol % or more, the concentration of all of the monomers as raw materials in the reaction mixture is adjusted to 45 to 70 mass % and the polymerization reaction temperature is adjusted to 0 to 35° C. to carry out the polymerization reaction, and after the polymerization reaction, the reaction mixture is diluted with water or a polar solvent such that the reaction mixture has a polymer concentration of 5 to 40 mass %, followed by the decomposition of the radical polymerization initiator, (8) a process as recited in any one of the above (1) to (7), wherein the polymer after completion of the polymerization reaction has a residual monomer content of 2 mol % or less based on the monomer constituent units in the polymer, and a residual peroxide ion content after the decomposition of the radical polymerization initiator is 20 ppm or less as a solid of a purified polymer, (9) a process for producing an inkjet recording medium, which comprises preparing a copolymer of diallyldialkylammonium salt and maleic acid according to the process recited in any one of the above (1) to (8) and causing the resultant copolymer to exist on or in a substrate directly or indirectly to obtain an inkjet recording medium, and

(10) an inkjet recording medium obtained by the process recited in the above (9).

Effect of the Invention

According to this invention, there can be produced a copolymer of diallyldialkylammonium salt and maleic acid which copolymer contains almost no monomer or polymerization initiator and consequently easily exhibits excellent performances in various fields of use. In particular, according to this invention, even if the polymerization is carried out in the presence of a large amount of a polymerization initiator for decreasing the amount of a residual monomer in a copolymer to be obtained, there can be produced a copolymer of diallyldialkylammonium salt and maleic acid which copolymer contains almost no residual monomer or residual polymerization initiator, such as a bipolymer of diallyldialkylammonium salt and maleic acid or a terpolymer of diallyldialkylammonium salt, maleic acid and sulfur dioxide.

Further, when the thus-obtained copolymer of diallyldialkylammonium salt and maleic acid is used, there can be produced an inkjet recording medium excellent in the light resistance of printing under accelerated conditions of strong light intensity.

PREFERRED EMBODIMENT OF THE INVENTION

The process for producing a copolymer of diallyldialkylammonium salt and maleic acid, provided by this invention, will be explained first. This process comprises polymerizing a monomer mixture comprising diallyldialkyl ammonium salt of the following general formula (I),

[CF6]

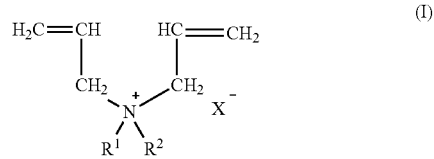

wherein each of $R^1$ and $R^2$ is independently an alkyl group having 1 to 3 carbon atoms and $X^-$ is a counter ion, and maleic acid of the following formula (II),

[CF7]

(II)

in the presence of persulfate as a radical polymerization initiator in water or a polar solvent, and, after completion of the polymerization reaction, decomposing the radical polymerization initiator to produce a copolymer comprising a diallyldialkylammonium salt constituent unit of the general formula (III) or (IV),

[CF8]

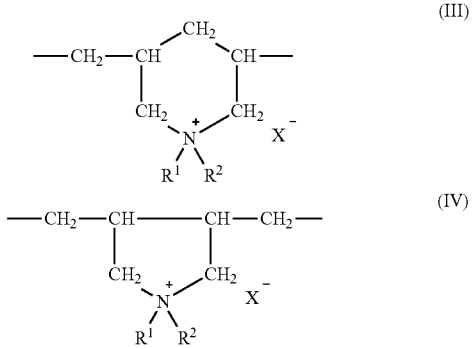

wherein each of $R^1$ and $R^2$ is independently an alkyl group having 1 to 3 carbon atoms and $X^-$ is a counter ion, and
a maleic acid constituent unit of the following formula (V),

[CF9]

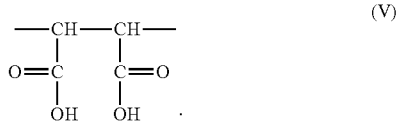
(V)

The diallyldialkylammonium salt used as a raw material monomer is represented by the following general formula (I).

[CF10]

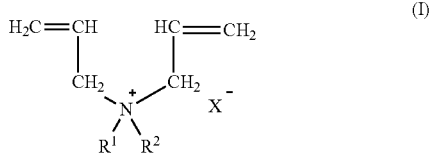
(I)

In the general formula (I), each of $R^1$ and $R^2$ independently represents an alkyl group having 1 to 3 carbon atoms, and examples thereof include methyl, ethyl and propyl. $X^-$ represents a counter ion, and examples thereof include chlorine ion, bromine ion and iodine ion. Chlorine ion is preferred from the viewpoint of easy availability and monomer stability.

Specific examples of the diallyldialkylammomium salt used in this invention include diallyldialkylammonium chloride, diallydialkylammonium bromide and diallydialkylammonium iodide.

The maleic acid as a raw material used in this invention is represented by the following formula (II).

[CF11]

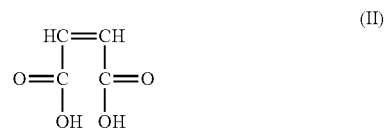
(II)

In this invention, the molar ratio of the diallyldialkylammomium salt (I) and the maleic acid (II) as raw materials is preferably 1:(0.1-1.0), more preferably 1:(0.15-1.0), still more preferably 1:(0.2-1.0). When the amount of the maleic acid (II) is small, it is hard to exhibit properties of an amphoteric copolymer, and when the amount of the maleic acid (II) is too large, the content of the diallyldialkylammonium salt in the copolymer is small, so that the amount of the maleic acid (II) per mole of the diallyldialkylammonium salt (I) is limited to 0.1 to 1.0 mol. In this invention, for modifying properties of the copolymer to be obtained, a third monomer such as sulfur dioxide may be used in addition to the monomer of the general formula (I) and the monomer of the formula (II). When the third monomer is contained, the amount of the third monomer based on the total amount of the monomers as raw materials is preferably 0.1 to 30 mol %, more preferably 0.1 to 15 mol %, still more preferably 0.1 to 7 mol %.

In this invention, persulfate is used as a radical polymerization initiator (to be also sometimes described as "a polymerization initiator" or "an initiator" in the present specification). Examples of the persulfate include ammonium persulfate, sodium persulfate and potassium persulfate.

The process of this invention is suitably used when the amount of the initiator for the polymerization is increased in order to decrease the content of the residual monomer in the copolymer based on the monomer units in the copolymer to 5 mol % or less, preferably 2 mol % or less, still more preferably 1 mol % or less. When the amount of the initiator is too small, the polymerization conversion ratio is liable to be small, and when it is too large, it takes time to decompose the initiator, so that it is preferred to change the amount thereof as required. The amount of the initiator (total amount of the initiator added) based on the total molar amount of all of the monomers is preferably 3 mol % or more, more preferably 4 to 60 mol %, still more preferably 5 to 50 mol %, particularly preferably 6 to 40 mol %, most preferably 7 to 30 mol %. In the method of adding the initiator in this invention, it is preferred to divide the initiator into portions and add them for thoroughly decreasing the residual monomer in the polymerization reaction mixture, and preferably it is divided into three portions or more and added three times or more, more preferably it is divided into five portions or more and added five times or more. In this invention, when the residual monomer in the polymerization reaction mixture cannot be decreased to a target value or less, preferably, the initiator is further added to decrease the residual monomer thoroughly.

In this invention, the solvent that is used for the polymerization reaction is selected from water or a polar solvent. The polar solvent can be selected from methanol, ethanol, dimethyl sulfoxide (DMSO), dimethylformamide (DMF), etc. As a solvent for the polymerization reaction, water is particularly preferred from the viewpoint of polymerization reactivity and safety.

In this invention, preferably, the copolymer solution is diluted with water or a polar solvent as required before the initiator is decomposed after completion of the polymerization reaction. The amount of the solvent for the dilution needs to be adjusted as required depending upon the copolymer that is produced. Generally, a reaction for decomposing the initiator is preferably carried out after the copolymer concentration is adjusted to 5 to 40 mass %. In this case, when the copolymer concentration is too thin, the operation of concentration under reduced pressure may be required as a post treatment, which is liable to take time and labor. When the copolymer concentration is too high, an excess polymerization reaction may take place together with the reaction for decomposing the initiator, the copolymer may undergo a change in molecular weight, or gelling may take place.

In this invention, preferably, the decomposition of the initiator after completion of the polymerization reaction is preferably carried out by heat-treating it at 65 to 80° C. When the temperature is less than 65° C., the decomposition of the initiator is liable to take time, and when it exceeds 80° C., the molecular weight sometimes changes, and further it is sometimes difficult to obtain a water-soluble copolymer since gelling takes place. In this invention, the heat treatment for the decomposition of the initiator can be carried out under atmospheric pressure.

In this invention, the active amount, as a solid, of the initiator after the decomposition of the initiator is preferably 100 ppm or less, more preferably 50 ppm or less, still more preferably 30 ppm or less, particularly preferably 20 ppm or less.

As specific examples of the process for producing the copolymer, provided by this invention, the process for producing a bipolymer of diallyldialkylammonium salt (I) and maleic acid (II) and the process for producing a terpolymer of diallyldialkylammonium salt (1), maleic acid (II) and sulfur dioxide will be explained one after the other below.

In the process for producing a bipolymer of diallyldialkylammonium salt (I) and maleic acid, the molar ratio of the diallyldialkylammonium salt (I) and the maleic acid (II) to be used as monomers is preferably 1:(0.1-1), and the amount of the persulfate based on the total molar amount of all of the monomers is preferably 3 mol % or more. The concentration of all of the monomers that are polymerized in the reaction mixture is preferably 20 to 70 mass %, more preferably 23 to 65 mass %, still more preferably 25 to 60 mass %.

The temperature during the polymerization reaction is preferably 30 to 62° C., more preferably 35 to 61° C., still more preferably 40 to 60° C.

The concentration of the entire polymer in the reaction mixture that is to be subjected to the reaction for the decomposition of the initiator after completion of the polymerization reaction is preferably 5 mass % or more but less than 20 mass %, more preferably 10 to 18 mass %, still more preferably 13 to 17 mass %.

In this case, preferably, the reaction mixture is diluted with water or a polar solvent as required and then the reaction for decomposition of the initiator is carried out.

The process for producing a terpolymer of diallyldialkylammonium salt (I), maleic acid and sulfur dioxide will be explained below. In this case, for example, the molar ratio of the diallyldialkylammonium salt (I) and the maleic acid as monomers to be used is preferably 1:(0.1-1). Further, the amount of the sulfur dioxide based on the total molar amount of all of the monomers is preferably 0.1 to 30 mol %, and the amount of the persulfate based on the total molar amount of all of the monomers is preferably 3 mol % or more.

The concentration of all of the monomers that are polymerized in the reaction mixture is suitably 45 to 70 mass %, more preferably 47 to 68 mass %, still more preferably 48 to 65 mass %.

The temperature during the polymerization reaction is preferably 0 to 35° C., more preferably 5 to 30° C., still more preferably 10 to 25° C.

The concentration of the polymer in the reaction mixture that is to be subjected to the reaction for the decomposition of the initiator after completion of the polymerization reaction is preferably 5 to 40 mass %, more preferably 15 to 35 mass %, still more preferably 20 to 30 mass %.

In this case, preferably, the reaction mixture is diluted with water or a polar solvent as required and then the reaction for decomposition of the initiator is carried out.

The process for producing an inkjet recording medium, provided by this invention, will be explained below. This process comprises preparing a copolymer of diallyldialkylammonium salt and maleic acid according to the above-described process and causing the resultant copolymer to exist in a substrate directly or indirectly to obtain an inkjet recording medium.

The process for preparing a copolymer of diallyldialkylammonium salt and maleic acid has been already explained in detail and hence is omitted here. The process for causing the resultant copolymer to exist in a substrate directly or indirectly will be explained. This process includes the following embodiments (1) to (5).

(1) The copolymer of diallyldialkylammonium salt and maleic acid is converted to an aqueous solution having its concentration of 0.03 to 5 W/V %, and the aqueous solution is mixed with a generally used binder such as starch oxide or polyvinyl alcohol if necessary, and the thus-prepared solution is applied directly to paper as a substrate with a coater such as a size press or a roll coater.

(2) A binder containing a pigment highly capable of absorbing an ink (e.g., synthetic silica, synthetic alumina or calcium carbonate) is applied onto paper as a substrate, and the copolymer of diallyldialkylammonium salt and maleic acid is applied to the surface of the formed binder-coating layer with an air knife coater or a sprayer.

(3) A coating liquid obtained by adding the copolymer of diallyldialkylammonium salt and maleic acid to a pigment and a binder is applied directly to paper as a substrate.

(4) An aqueous solution of the copolymer of diallyldialkylammonium salt and maleic acid is applied to the surface of a plastic, woven fabric or a leather product as a substrate, or the above substrate is immersed in the above aqueous solution, to make the copolymer bond to the surface thereof to form a coating layer.

(5) Immediately before liquid drops of a water-color ink containing a dye are caused to adhere, the copolymer of diallyldialkylammonium salt and maleic acid is caused to adhere to at least a recording-forming region of an inkjet recording medium.

In the process for producing an inkjet recording medium, provided by this invention, when there is produced paper that internally contains the copolymer of diallyldialkylammonium salt and maleic acid, a synthetic pulp or a synthetic fiber may be used in addition to a pulp that is a raw material, and further, the paper can be improved in whiteness by internally adding a white pigment such as titanium oxide, calcium carbonate or zeolite together with the copolymer of this invention.

The copolymer of diallyldialkylammonium salt and maleic acid can be used in combination with other agents for coating. For example, it can be mixed with cation-modified starch, starch oxide, polyvinyl alcohol, a polyacrylamide for surface coating or a surface sizing agent, and the mixture can be applied. Further, as a pigment for coating, there are included synthetic amorphous silica, clay, talc, diatomaceous earth, calcium carbonate, barium sulfate, titanium oxide, zinc oxide, satin white and aluminum silicate. Other additives such as a surface sizing agent, a non-slipping agent, an antiseptic agent, a defoaming agent, a viscosity-adjusting agent and a dye may be used in combination.

The coating amount of the copolymer of diallyldialkylammonium salt and maleic acid is generally 0.05 to 10 g/m$^2$, preferably 0.2 to 5 g/m$^2$.

Inkjet recording can be carried out by causing liquid drops of the water-color ink containing a dye to adhere to the inkjet recording medium obtained by making the copolymer of diallyldialkylammonium salt and maleic acid exist on or in the substrate. As a water-color ink, any water-color ink containing dye such as a direct dye, an acidic dye or a reactive dye, generally used for inkjet recording, can be used. The inkjet recording can be carried out by causing a generally used apparatus to generate fine liquid drops of a water-color ink to fly and causing the fine liquid drops to adhere to the above recording medium. The inkjet recording process of this invention can be widely applied to a facsimile machine, a printer, a computer terminal, etc.

EXAMPLES

Example 1

Preparation Example of 1:1 Bipolymer of Diallyldimethylammonium Chloride and Maleic Acid According to the Process of this Invention In a 300-mL four-necked separable flask having a stirrer, a condenser and a thermometer, 61.7 g (0.3 mol) of a 65 mass % diallyldimethylammonium chloride aqueous solution, 34.8 g (0.3 mol) of maleic acid and 153.2 g of water were dissolved, and the internal temperature was elevated up to 50° C. After the temperature was stabilized, 52.57 g (0.07 mol) of a 28.5 mass % ammonium persulfate aqueous solution was added in seven divided portions to carry out the polymerization at 50° C. for 70 hours. After completion of the polymerization, the solution was measured by GPC (gel permeation chromatography) to show a weight average molecular weight of 11,800 and a polymerization yield of 100.0%. A residual monomer was determined by GPC to show 0 mol % (less than 1 mol %) as a solid.

To the copolymer solution obtained after the polymerization was added 223.4 g of water to dilute it, and the diluted solution was heat-treated at 70° C. for 16 hours to carry out treatment for decomposition of the initiator. The ammonium persulfate after the decomposition treatment was subjected to simple measurement for residual peroxide ion with semi-quantitative ion test paper (Quantofix® Peroxid, MACHEREY-NAGEL) to show 15 ppm as a solid.

Comparative Example 1

Preparation Example of 1:1 Bipolymer of Diallyldimethylammonium Chloride and Maleic Acid without Carrying Out the Treatment for Decomposition of an Initiator A 1:1 copolymer of diallyldimethylammonium chloride and maleic acid was prepared in the same manner as in Example 1 except that the treatment for decomposition of an initiator was not carried out. The ammonium persulfate was subjected to simple measurement for residual peroxide ion according to the above semi-quantitative ion test method to show 150 ppm as a solid.

Example 2

Preparation Example of 20:9:1 Terpolymer of Diallyldimethylammonium Chloride, Maleic Acid and Sulfur Dioxide According to the Process of this Invention In a 300-mL four-necked separable flask having a stirrer, a condenser and a thermometer, to an aqueous solution of 298.5 g (1.2 mol) of a 65 mass % diallyldimethylammonium chloride aqueous solution, 63.3 g (0.54 mol) of maleic acid and 3.8 g (0.06 mol) of sulfur dioxide in 68.6 g of water was added 41.1 g (0.18 mol) of ammonium persulfate aqueous solution in nine divided portions, to carry out the polymerization at 18° C. for 72 hours. After completion of the polymerization, the solution was measured by GPC (gel permeation chromatography) to show a weight average molecular weight of 33,000 and a polymerization yield of 100.0%. A residual monomer was determined by GPC to show 0 mol % (less than 1 mol %) as a solid.

After completion of the polymerization, 566.8 g of water was added to the copolymer solution to dilute it, and the diluted solution was heat-treated at 70° C. for 16 hours to carry out treatment for decomposition of the initiator. The ammonium persulfate after the decomposition treatment was subjected to simple measurement for residual peroxide ion with semi-quantitative ion test paper to show 10 ppm as a solid.

Comparative Example 2

Preparation Example of 20:9:1 Terpolymer of Diallyldimethylammonium Chloride, Maleic Acid and Sulfur Dioxide Without Carrying Out Treatment for Decomposition of an Initiator A 20:9:1 terpolymer of diallyldimethylammonium chloride, maleic acid and sulfur dioxide was prepared in the same manner as in Example 2 except that the treatment for the decomposition of the initiator was not carried out. Simple measurement was made for residual peroxide ion with semi-quantitative ion test paper to show 150 ppm as a solid.

Example 3

Preparation of Inkjet Recording Paper and Light Resistance Test 10.8 Parts by weight of synthetic amorphous silica (trade name; FINESIL X-37B supplied by Tokuyama Corporation) as an inorganic pigment, 2.9 parts by weight of polyvinyl alcohol (trade name: PVA-235, supplied by Kuraray Co., Ltd.) as a binder, 1.2 parts by weight (as a solid) of the copolymer obtained in Example 1 or 2 or Comparative Example 1 or 2 as a fixing agent and 0.1 part of boric acid as a hardening agent were uniformly mixed to prepare ink-receiving layer coating liquids having a solid concentration of 15 mass % each. The thus-prepared coating liquids were each applied onto a marshmallow paper (trade name: OK marshmallow Coc, supplied by Oji Paper Co., Ltd.), and the applied coating liquids were dried to make inkjet recording paper sheets.

Then, solid printing of a square pattern having a side of 1 cm was carried out on each test paper sheet using Magenta or Yellow with an inkjet printer (trade name: PM-A900, supplied by EPSON Corporation), and these paper sheets were subjected to a light resistance test under accelerated conditions of strong light intensity with a xenon fade-o-meter (trade name: Xenon Fade-O-Meter X25F, supplied by Suga Test Instruments Co., Ltd.). Light resistance was evaluated according to the following evaluation standard.

⊚: Fading was not observed entirely.
◯: Fading was not observed.
Δ: Slight fading was observed.
X: Fading was significantly observed.

TABLE 1

| Copolymer used | Magenta | Yellow |
|---|---|---|
| Example 1 (Bipolymer for which the treatment for decomposition of initiator was carried out) | ⊚ | ⊚ |
| Comparative Example 1 (Bipolymer for which no treatment for decomposition of initiator was carried out) | X | X |
| Example 2 (Terpolymer for which the treatment for decomposition of initiator was carried out) | ◯ | ◯ |
| Comparative Example 2 (Terpolymer for which no treatment for decomposition of initiator was carried out) | X | Δ |

From the results in Table 1, it is clear that the inkjet recording medium obtained by preparing the copolymer according to the process of this invention and applying the thus-obtained copolymer to paper as a substrate is improved in light resistance of printing (magenta and yellow) under accelerated conditions of strong light intensity. In a light resistance test that was carried out under conditions of weak light intensity with a carbon arc fade-o-meter, no fading was observed when any one of the copolymers of Examples 1 and 2 and Comparative Examples 1 and 2 was used.

INDUSTRIAL UTILITY

According to this invention, there can be produced a copolymer of diallyldialkylammonium salt and maleic acid, in which not only residual monomers but also a polymerization initiator hardly remain, so that the copolymer consequently stably exhibits excellent performances in various uses. In particular, according to this invention, even if the polymerization is carried out in the presence of a large amount of a polymerization initiator for decreasing the amount of a residual monomer in a copolymer to be obtained, there can be produced a copolymer of diallyldialkylammonium salt and maleic acid, in which copolymer a residual monomer or residual polymerization initiator is hardly remains, such as a bipolymer of diallyldialkylammonium salt and maleic acid or a terpolymer of diallyldialkylammonium salt, maleic acid and sulfur dioxide.

Since being free of remaining monomers and a polymerization initiator, the copolymer obtained is used in the fields of a flocculating agent, a deodorant and a paper-making auxiliary, and in particular it is preferably used in the production of an inkjet recording medium excellent in the light resistance of printing.

The invention claimed is:
1. A process for producing a copolymer of diallyldialkyl ammonium salt and maleic acid, which comprises polymerizing a monomer mixture comprising diallyldialkyl ammonium salt of the following general formula (I),

[CF1]

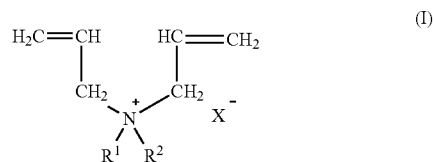

wherein each of $R^1$ and $R^2$ is independently an alkyl group having 1 to 3 carbon atoms and $X^-$ is a counter ion, and maleic acid of the following formula (II),

[CF2]

in the presence of persulfate as a radical polymerization initiator in water or a polar solvent, and, after completion of the polymerization reaction, decomposing the radical polymerization initiator by heat treatment to produce a copolymer comprising a diallyldialkylammonium salt constituent unit of the general formula (III) or (IV),

[CF3]

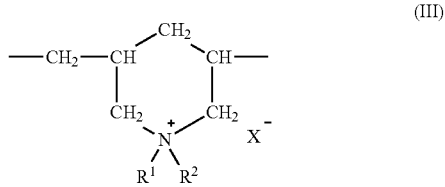

wherein each of $R^1$ and $R^2$ is independently an alkyl group having 1 to 3 carbon atoms and $X^-$ is a counter ion,
and
a maleic acid constituent unit of the following formula (V),

[CF4]

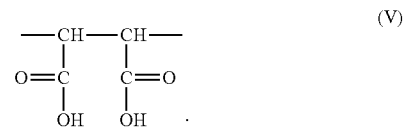

2. The process of claim 1, wherein the monomer mixture as a raw material comprises the diallyldialkylammonium salt (I) and the maleic acid (II), and the copolymer as an end product is a bipolymer of the diallyldialkylammonium salt constituent unit (III) or (IV) and the maleic acid constituent unit (V).

3. The process of claim 1, wherein the monomer mixture as a raw material comprises the diallyldialkylammonium salt (I), the maleic acid (II) and sulfur dioxide, and the copolymer as an end product is a terpolymer of the diallyldialkylammonium salt constituent unit (III) or (IV), the maleic acid constituent unit (V) and a sulfur dioxide constituent unit of the following formula (VI),

[CF5]

(VI)

4. The process of claim 1, wherein the completion of the polymerization is followed by heat treatment at 65 to 80° C. to decompose the radical polymerization initiator.

5. The process of claim 1, wherein the radical polymerization initiator is decomposed after a reaction mixture obtained after the completion of the polymerization is diluted with water or a polar solvent.

6. The process of claim 2, wherein the molar ratio of the diallyldialkylammonium salt (I) and the maleic acid (II) as raw material monomers is adjusted to 1:(0.1-1), the amount of the persulfate to be used based on the total molar amount of all of the monomers is adjusted to 3 mol % or more, the concentration of all of the monomers as raw materials in the reaction mixture is adjusted to 20 to 70 mass % and the polymerization reaction temperature is adjusted to 30 to 62° C. to carry out the polymerization reaction, and after the polymerization reaction, the reaction mixture is diluted with water or a polar solvent such that the reaction mixture has a polymer concentration of 5 mass % or more but less than 20 mass %, followed by the decomposition of the radical polymerization initiator.

7. The process of claim 3, wherein the molar ratio of the diallyldialkylammonium salt (I) and the maleic acid (II) as raw material monomers is adjusted to 1:(0.1-1), the amount of the sulfur dioxide as a raw material based on the total molar amount of all of the monomers is adjusted to 0.1 to 30 mol %, the amount of the persulfate based on the total molar amount of all of the monomers is adjusted to 3 mol % or more, the concentration of all of the monomers as raw materials in the reaction mixture is adjusted to 45 to 70 mass % and the polymerization reaction temperature is adjusted to 0 to 35° C. to carry out the polymerization reaction, and after the polymerization reaction, the reaction mixture is diluted with water or a polar solvent such that the reaction mixture has a polymer concentration of 5 to 40 mass %, followed by the decomposition of the radical polymerization initiator.

8. The process of claim 1, wherein the polymer after completion of the polymerization reaction has a residual monomer content of 2 mol % or less based on the monomer units in the polymer, and a residual peroxide ion content after the decomposition of the radical polymerization initiator is 20 ppm or less as a solid of a purified polymer.

9. A process for producing an inkjet recording medium, which comprises preparing a copolymer of diallyldialkylammonium salt and maleic acid according to the process recited in claim 1 and causing the resultant copolymer to exist on or in a substrate directly or indirectly to obtain an inkjet recording medium.

10. An inkjet recording medium obtained by the process recited in claim 9.

* * * * *